Aug. 28, 1962  J. E. WILSON  3,051,201
FLUID CONNECTION AND METHOD OF MAKING SAME
Filed Oct. 23, 1957  2 Sheets-Sheet 2
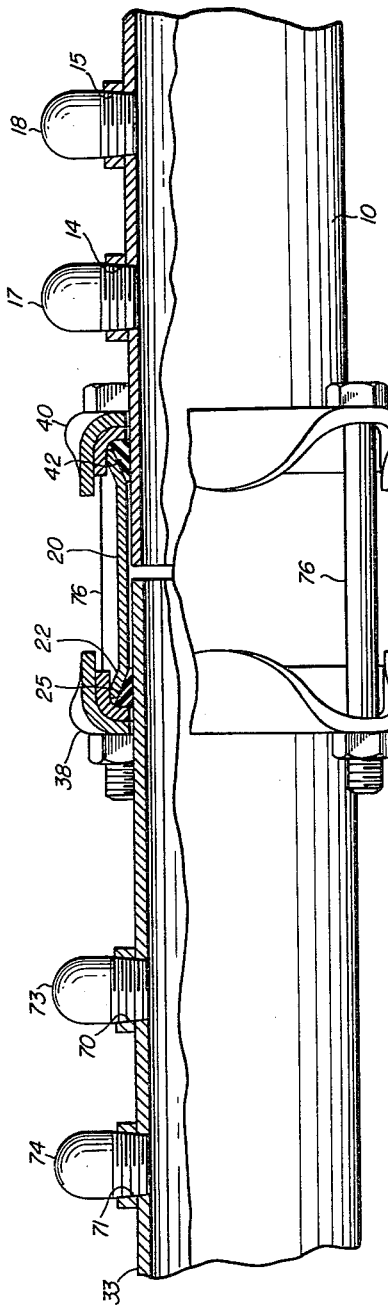
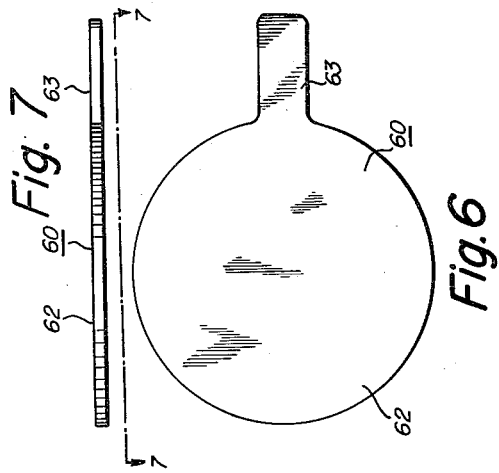
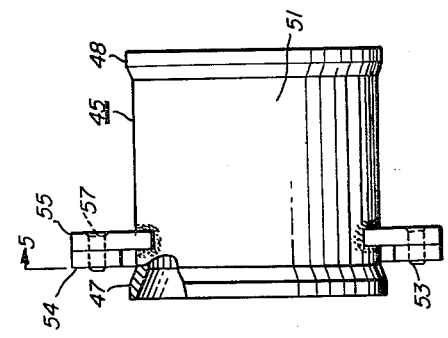
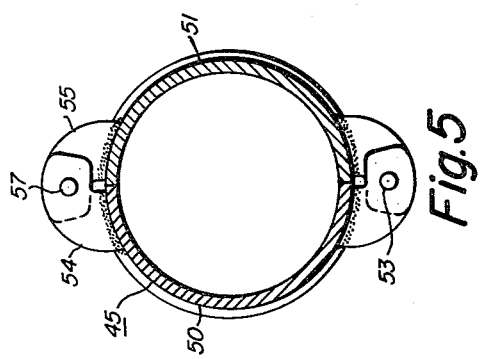
INVENTOR.
JOHN E. WILSON
BY Woodling & Krost
Attys.

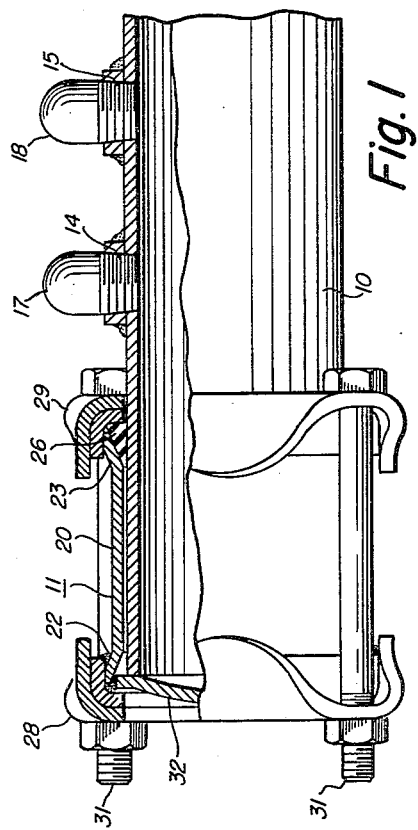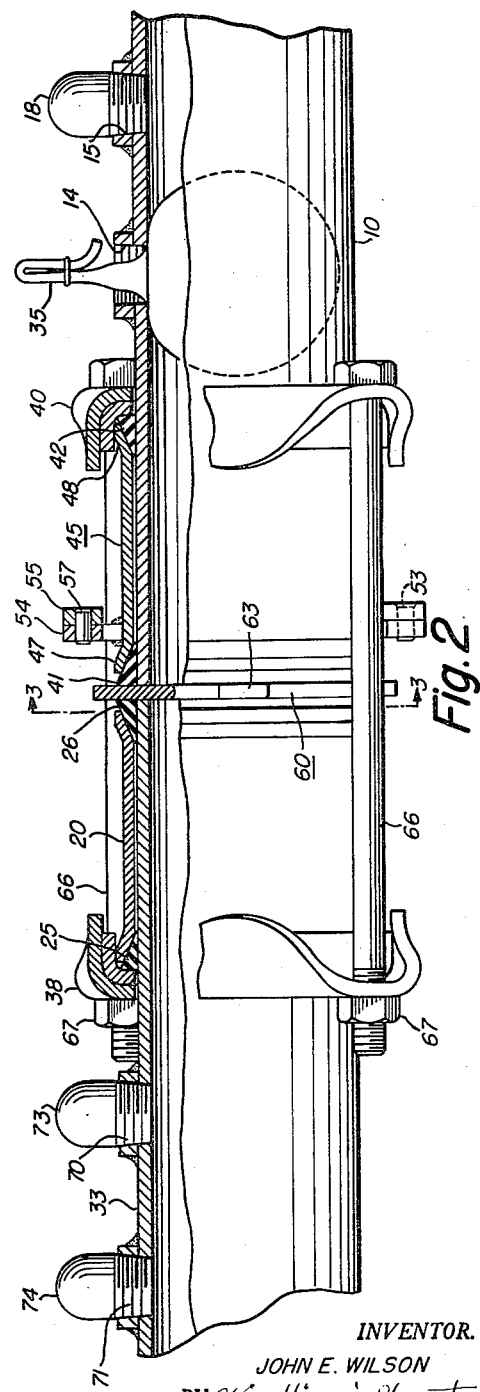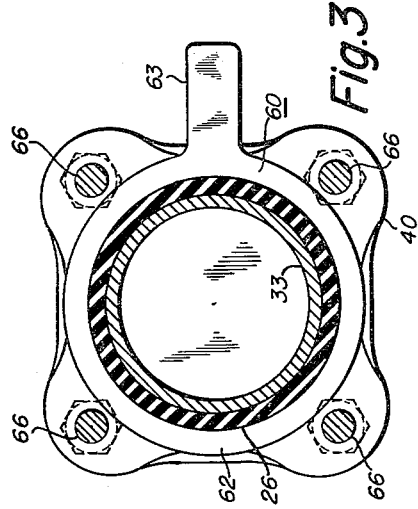

United States Patent Office 3,051,201
Patented Aug. 28, 1962

3,051,201
FLUID CONNECTION AND METHOD
OF MAKING SAME
John E. Wilson, 4315 W. 162nd St., Cleveland 11, Ohio
Filed Oct. 23, 1957, Ser. No. 691,946
2 Claims. (Cl. 138—94.3)

The invention relates in general to a method of connecting an extension conduit to a pipe and pressure testing the extension and to the fluid connection which is utilized in the method.

It is often times desired to extend pipe lines which carry a fluid under pressure. An example of this would be in case of gas lines where new homes are being installed. It is necessary to extend the pipe line to provide gas service to the new homes and of necessity the extension of the gas lines must be joined to the place where the old pipe line was previously dead-ended. It is also necessary that the extension of the old pipe line be pressure tested to insure that it is fluid tight.

Accordingly it is an object of the present invention to provide a method for connecting an extension to a pipe or pipe line carrying fluid under pressure and for pressure testing the extension.

Another object of the invention is to provide a fluid connection for connecting an extension to a pipe and for pressure testing the extension.

Another object of the invention is to provide a hinged or plural part sleeve and a flat valve member having handle means for use in the above referred to fluid connection and method.

Other objects and a fuller understanding of this invention may be had by referring to the following description and claims, taken in conjunction with the accompanying drawings, in which:

FIGURE 1 is a side elevational view partially in section of a pipe having its open end closed by means of a fitting;

FIGURE 2 is a side elevational view partially in section of the pipe shown in FIGURE 1 with the end thereof uncovered and an extension along with a fitting and apparatus for joining the pipe and extension and pressure testing the extension;

FIGURE 3 is a view taken generally along the line 3—3 of FIGURE 2;

FIGURE 4 is a side elevational view partially in section of a hinged or plural part sleeve utilized in FIGURE 2;

FIGURE 5 is a view taken along the line 5—5 of FIGURE 4;

FIGURE 6 is a view of a valve member which is utilized in FIGURE 2;

FIGURE 7 is a view taken along the line 7—7 of FIGURE 6; and

FIGURE 8 is a side elevational view partially in section of the pipe and extension shown in FIGURE 2 and the connection used in the final assembly of the two members.

FIGURE 1 illustrates a pipe 10 which for the sake of illustration in the present embodiment, may be the end of a gas pipe line which has been dead-ended by means of a fitting 11. The end of the pipe 10 is provided with first and second threaded openings 14 and 15, respectively, which are closed by means of first and second caps 17 and 18, respectively, which screw into the threaded openings 14 and 15. The fitting 11 includes a sleeve 20 having first and second upturned end portions 22 and 23, respectively. A tapered sealing ring 26 resides between the second end portion 23 of the sleeve 20, and the outer surface of the pipe 10. First and second opposed followers 28 and 29 reside at either end of the sleeve 20, and follower 28 is secured thereto while follower 29 bears against the second end portion 23 and the sealing ring 26. Bolts 31 extend between the followers 28 and 29 and serve to draw the follower 29 into engagement with the sleeve 20 and cause the sealing ring to provide a seal between the end 23 of the sleeve and the second follower. It will be noted that follower 28 differs from 29 in that it has a central portion 32 which covers and closes the end of pipe 10.

In the event that it is desired that the pipe line be extended, an extension 33 (FIGURE 2) is added thereto. To provide this extension the cap 17 in pipe 10 is removed and an inflatable bag 35 is inserted into the interior of the pipe 10 and is inflated to close off the fluid flow through the same. The fluid pressure in gas lines which service homes is in the neighborhood of one (1) p.s.i. and the inflated bag 35 prevents flow quite nicely. The fitting 11 shown in FIGURE 1 and specifically the follower 28 with the attached sleeve 20 and central portion 32 is next removed from the end of the pipe. A sleeve which may be similar to the sleeve 20 and as a result is also indicated by the reference numeral 20, is placed over the end of the extension 33. Sealing rings are placed at either of the outwardly flared end portions of the sleeve 20 and have been indicated by the reference numerals 25 and 26. Before the sleeve 20 is placed on the extension a follower 38 is slid thereon which is similar to follower 29 shown in FIGURE 1. It will also be apparent that the sealing ring 25 is placed on the extension before the sleeve 20 and the sealing ring 26. A follower 40 similar to follower 29, or which may be follower 29, is placed on the end portion of the pipe 10 as well as sealing rings 41 and 42. A hinged, split or plural part sleeve 45 which includes parts 50 and 51, best seen in FIGURES 4 and 5, is placed over the end of the pipe 10. The hinged sleeve includes first and second outwardly flared end portions 47 and 48, respectively. The parts 50 and 51 of the hinged sleeve 45 are pivotally secured together by means of a pin 53. First and second flanges 54 and 55 are respectively provided on the parts 50 and 51 and each has a mating opening through which a pin 57 may be inserted to secure the parts in a closed position. As shown in FIGURE 2, the hinged flange is shown in place on the end of the pipe 10 with the sealing rings 41 and 42, respectively, residing between the outwardly flared end portions thereof and the outer surface of the pipe 10.

A flat member or circular valve member 60 is then placed between the aligned ends of the pipe 10 and the extension 33, as best seen in FIGURE 2. The circular valve member 60 (FIGURE 6) includes a circular body portion 62 and a handle member 63 integrally secured thereto and extending therefrom. When the parts have all been assembled as shown in FIGURE 2, bolts 66 are extended between the followers 38 and 40 and are secured in this position by means of nuts 67. The nuts 67 are then tightened on the bolts and the followers 38 and 40 are drawn toward each other which urges the sealing rings (25, 42) under the outer ends of their respective sleeves into engagement with the sleeves and also with the follower. This also causes the sealing rings (26, 41) at the inner ends of the respective sleeves to be drawn into tight engagement therewith and also causes the sealing rings to be urged into tight engagement with opposed sides of the circular valve member 60. It will be noted from FIGURE 3 that the bolts 66 reside just outside and adjacent to the periphery of the flat member 60 to insure that it cannot be removed before the bolts 66 are removed.

After this fluid tight connection has been made it is then necessary to pressure test the fluid extension 33. This is done by pressurizing the same with air, for example, in the case of gas lines from 65 to 100 p.s.i. and permitting the same to stand for a period of 24 to 48 hours. As a safety measure during the pressure testing the bag 35 is removed and the cap 17 is screwed into the opening. This insures that all of the fittings on the extension side of the connection are fluid tight. This pressure is then released. The extension 33 is also provided with first and second threaded openings 70 and 71, respectively, into which fit first and second threaded caps 73 and 74, respectively.

The next step is to introduce gas from the pipe 10 into the extension 33 and the pipe line which it services therebeyond. To accomplish this end, the threaded cap 73 is removed from the opening 70 and an inflatable bag (not shown in the drawings) similar to the inflatable bag 35 in the pipe 10 is inserted therein and inflated. The bag 35 is reinserted into the pipe 10. The threaded cap 18 in pipe 10 and the threaded cap 74 in the extension 33 are next removed and a bypass conduit is provided therebetween. This bypass conduit has not been shown in the drawings and is of a small size as compared to the internal diameter of the pipe 10 and extension 33. The purpose of using a small conduit to introduce gas from pipe 10 into extension 33 is so that there will not be a sudden drain on the gas contained in pipe 10 and a sudden disruption of the gas supply from homes previously supplied from pipe 10. The small conduit thus bleeds only a small part of the gas from pipe 10 into the extension 33 until the extension 33 and the pipe line serviced therebeyond has been filled with gas at substantially the same pressure as that contained in pipe 10.

After extension 33 has been filled with gas it is then necessary to provide the final fitting which will be used to permanently connect the pipe 10 and the extension 33. This permanent fitting connection has been shown in FIGURE 8. The fitting of FIGURE 8 is accomplished from the connection shown in FIGURE 2 by removing the bolts 66 (FIGURE 2) and the hinged sleeve 45. The valve or flat member 60 is also removed and the annular sealing rings 26 and 41 are cut so that they can be removed from around the pipe 10 and extension 33. The sleeve 20 is then moved to the right from the position shown in FIGURE 2 so that one end thereof resides on the extension 33 while the other end resides on the pipe 10. The sealing rings 25 and 42 are then moved inwardly toward each other and located as shown in FIGURE 8 at the respective end portions of the sleeve 20 and the followers 38 and 40 are also brought into this position. Bolts 76 which may be the same as the bolts 31 shown in FIGURE 1 are extended between the followers 38 and 40 to make the final connection between the pipe 10 and extension 33. The inflatable bags in the pipe 10 and extension 33 are next deflated and removed therefrom. The threaded caps 17 and 73 are then threaded back in place to prevent the escape of gas through these openings. The bypass conduit is preferably removed last and the caps 18 and 74 are threaded back into their respective openings in pipe 10 and extension 33.

It will thus be seen that an extremely efficient and novel method of connecting and testing a fluid connection between an old pipe line and an extension thereof has been provided by the use of the plural part sleeve 45 and the flat valve member 60. The use of the valve member 60 is extremely reliable in providing a pressure tight joint when relatively high test pressures are used in testing the new extension. The use of the hinged or plural part sleeve insures that the same may be removed from the connection after its primary purpose has been accomplished without having to misalign the ends of the pipe and extension. The bolts 66 which extend between the followers 38 and 40 in the temporary connection (FIGURES 2 and 3) lie closely adjacent the outer circumference of the valve member 60 and insures that there will not be accidental dislodging of the valve member during the testing operation. The use of the handle 63 aids in handling the valve member. It will also be apparent to those skilled in the art that certain variations in the order in which the steps are recited in the description and claims may be resorted to without departing from the teachings herein disclosed.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A fluid connection comprising in combination a pipe, an extension conduit coaxially aligned with said pipe and spaced from the end of said pipe, a flat annular valve member residing between the ends of said pipe and said extension and having a larger diameter than either, handle means on said valve member, a continuous annular sleeve residing on an end portion of said extension and having first and second outwardly flared end portions, a tapered sealing ring residing between said first outwardly flared end portion of said continuous annular sleeve and said extension adjacent one side of said flat annular valve member, a tapered sealing ring residing between said second outwardly flared end portion of said continuous annular sleeve and said extension, a first annular follower slidably residing on the surface of said extension and engageable with said second outwardly flared end portion of said continuous annular sleeve and said sealing ring thereat, a split sleeve residing on an end portion of said pipe and having first and second outwardly flared end portions, a tapered sealing ring residing between said first outwardly flared end portion of said split sleeve and said pipe adjacent another side of said flat annular valve member, a tapered sealing ring residing between said second outwardly flared end portion of said split sleeve and said pipe, a second annular follower slidably residing on the surface of said pipe and engageable with said second outwardly flared end portion of said split sleeve and said sealing ring thereat, bolts extending between said first and second annular followers to urge said sleeves and flat annular valve member and sealing rings together, said bolts surrounding said flat annular valve member and lying on the circumference of a circle of larger diameter than said flat annular valve member.

2. A fluid connection comprising in combination a pipe, an extension aligned with said pipe, a generally flat annular valve member residing between the ends of said pipe and said extension, a continuous annular sleeve slidably residing on an end portion of said extension and having first and second end portions slightly spaced from said extension, sealing means between said first end portion of said continuous annular sleeve and said extension adjacent one side of said generally flat annular valve member, sealing means residing between said second end portion of said continuous annular sleeve and said extension, a first follower slidable on said extension and engageable with said second end portion of said continuous annular sleeve and said sealing means thereat, a removable sleeve residing on said end portion of said pipe and having first and second end portions slightly spaced from said pipe, sealing means residing between said first end portion of said removable sleeve and said pipe adjacent another side of said generally flat annular valve member, sealing means residing between said second end portion of said removable sleeve and said pipe, a second follower slidable on said pipe and engageable with said second end portion of said removable sleeve and said sealing means thereat, and means extending between said first and second annular followers to bring said sleeves and generally flat annular valve member and sealing means together.

(References on following page)

References Cited in the file of this patent

UNITED STATES PATENTS

| | | |
|---|---|---|
| 571,220 | Dresser | Nov. 10, 1896 |
| 999,547 | Clark | Aug. 1, 1911 |
| 1,310,740 | Coffey | July 22, 1919 |
| 1,977,987 | Corby | Oct. 23, 1934 |
| 2,427,685 | Midtlying | Sept. 23, 1947 |
| 2,438,472 | Calcott | Mar. 23, 1948 |
| 2,590,565 | Osborn | Mar. 25, 1952 |
| 2,645,244 | Klickman | July 14, 1953 |
| 2,726,683 | Steinbach | Dec. 13, 1955 |
| 2,735,450 | Brayton | Feb. 21, 1956 |
| 2,775,469 | Brown | Dec. 25, 1956 |
| 2,858,115 | Stebbins | Oct. 28, 1958 |